Figure 1:
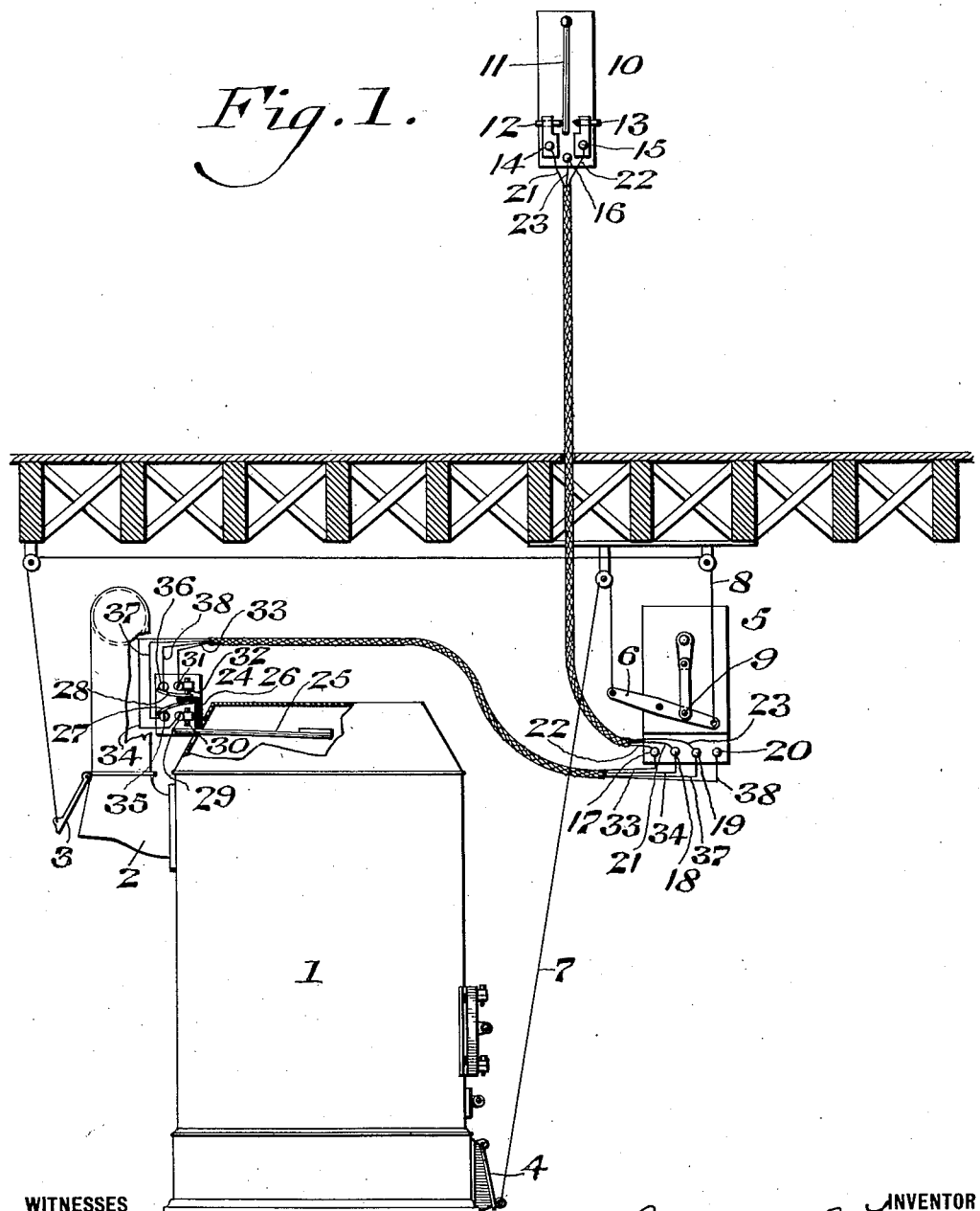

B. F. TEAL, DEC'D.
E. R. TEAL, EXECUTRIX.
AUTOMATIC TEMPERATURE REGULATOR.
APPLICATION FILED JULY 22, 1910.

1,067,627.

Patented July 15, 1913.

2 SHEETS—SHEET 1.

WITNESSES
L. Douville,
P. F. Nagle.

INVENTOR
Benjamin F. Teal.
BY Wiederstein & Fairbanks.
ATTORNEYS

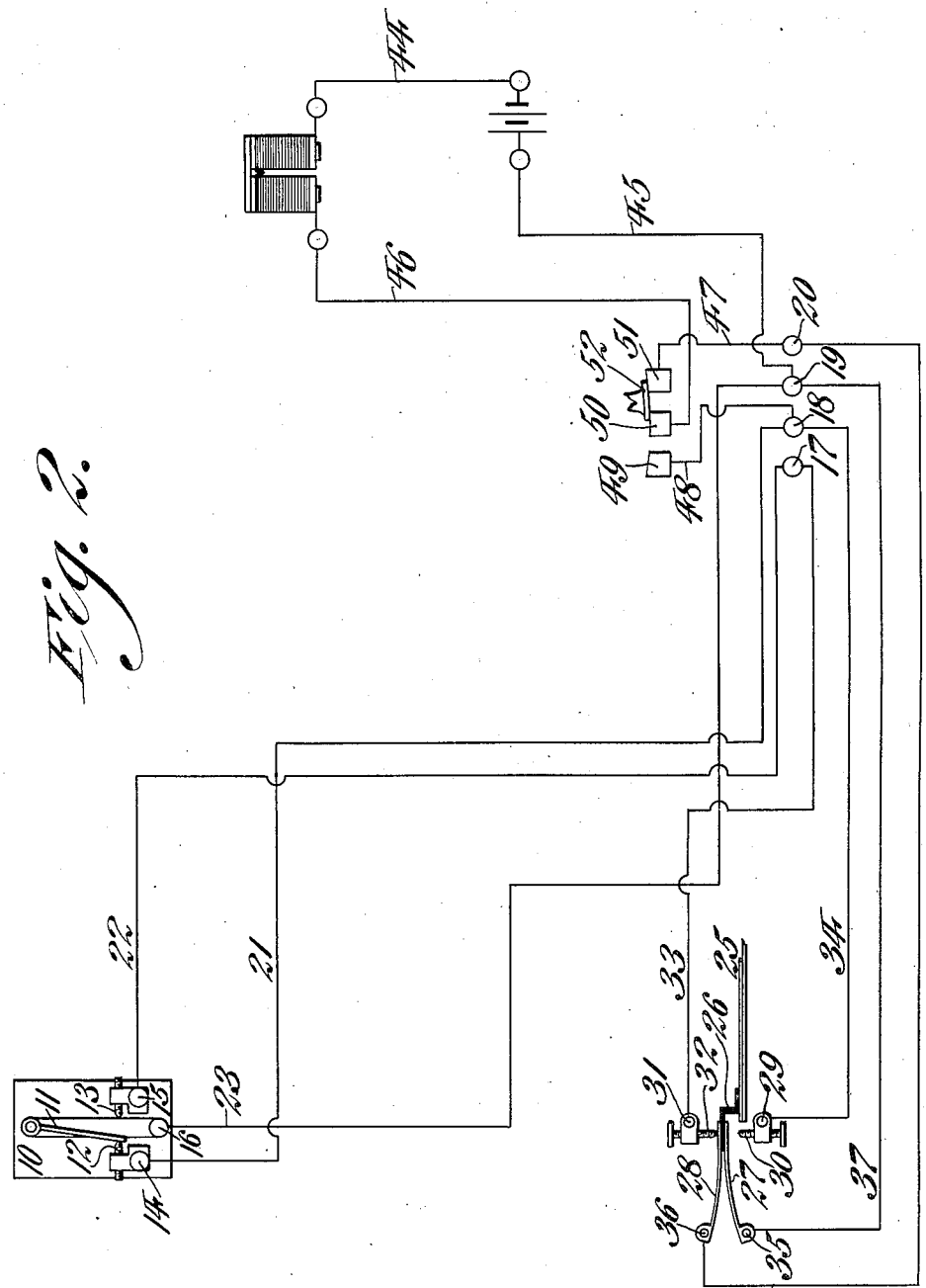

UNITED STATES PATENT OFFICE.

BENJAMIN F. TEAL, OF GLENSIDE, PENNSYLVANIA; ELLA R. TEAL, EXECUTRIX OF SAID BENJAMIN F. TEAL, DECEASED.

AUTOMATIC TEMPERATURE-REGULATOR.

1,067,627.   Specification of Letters Patent.   Patented July 15, 1913.

Application filed July 22, 1910. Serial No. 573,163.

*To all whom it may concern:*

Be it known that I, BENJAMIN F. TEAL, a citizen of the United States, residing at Glenside, county of Montgomery, State of Pennsylvania, have invented a new and useful Automatic Temperature - Regulator, of which the following is a specification.

My invention relates to new and useful devices for automatically regulating temperatures, in which the controlling action is derived from the source of heat or cold from which the desired temperature is produced. While such a device is capable of a large range of applications in the regulation of both heat and cold, the particular form hereinafter shown and described, is for regulating temperature in the heating of buildings by the ordinary means of hot air, although equally applicable to hot water and steam. In one class of existing devices of this character, the regulation is obtained from a thermostat located in the room to be heated, by which the effects of the maximum and minimum temperature, for which the instrument is adjusted, are electrically transmitted to a suitable mechanism for operating the furnace draft, and thereby regulating the fire so as to maintain the desired temperature in the room. A very serious defect, inherent in this method of regulation, lies in the fact that, so long as the temperature of the room is below the degree for which the thermostat is adjusted, the draft of furnace remains on, and as a consequence, the fire may burn away to a degree which is not only wasteful of fuel, but also, in the case of many furnaces, may become dangerous from overheating of the furnace and of the pipes for conveying the hot air throughout the building. It is obvious, therefore, that economy and safety require that a certain amount of attention and hand regulation be resorted to, to supplement this incomplete automatic action of the device. In another type of apparatus the device is attached to and actuated by the source of heat or temperature changing device; for example, the hot air furnace or the boiler, and controls the fire by operating the furnace drafts independently of the temperature of the room or rooms to be heated. In this case, so long as the temperature is below the maximum degree for which the thermostat is adjusted, the drafts will remain on, although the temperature of the room may be far in excess of the required point. The only remedy for this defect is hand regulation.

The object of my invention is to provide— in combination with a furnace regulation by the temperature of the room—a supplemental control of the heating source or temperature generator by means of its own temperature, and to do this by a method which renders the action of each of the two elements independent for shutting off the furnace drafts, but which makes them interdependent in putting drafts on. The result of the combination is that the respective deficiencies of the two before named systems are provided for in a manner which renders the control absolutely automatic; not only obviating the necessity for hand regulation, but also insuring a reliable temperature (in rooms) for a given adjustment.

In carrying out my invention, I employ a thermostat suitably located in one of the rooms to be heated; a supplemental thermostat located in, or in suitable relation to, the temperature generator; and a suitable means, common to and electrically connected to, both, for operating the furnace drafts.

For the purpose of a clearer description I have designated a thermostat, located in a room to be heated, as the "controller" and a second instrument suitably connected with the hot air chamber or furnace, the "thermostat". The means for actuating the furnace draft is called a "motor" and is common to both controller and thermostat.

In the drawings I have shown a construction for the automatic control of the furnace, which I have found operates successfully in practice, but it will be evident that the arrangement of the parts and application may be varied; other instrumentalities may be employed, and changes may be made in the construction which will come within the scope of my invention, and I do not therefore desire to be limited, in every instance, to the exact form as herein shown and described, since the same is only by way of illustration of the spirit of my invention and I desire to make such changes as may be necessary.

Figure 1 represents a diagrammatic view showing a furnace and the means for automatic regulation of the temperature, in suitable connection therewith. Fig. 2 represents a diagrammatic view on an enlarged scale, showing the electrical circuits.

Similar numerals of reference indicate corresponding parts in the figures.

Referring to the drawings: 1 designates a furnace suitably located, having a smoke flue 2 controlled by a damper 3 for check draft, and having a damper 4 controlling the air admission or draft to the furnace.

5 designates a motor, suitably situated with respect to the furnace, which is of any suitable or desired construction, and which, in the present instance, is provided with a lever 6 in suitable connection with the operative parts of the motor, one end of which lever is connected with the damper 4 by means of the connection 7; while the opposite end of the lever is suitably connected with the damper 3 for a check draft, by the connection 8, said connections being secured to said lever upon opposite sides of its pivotal point 9.

10 designates a controller which is located at a suitable point in a room or other locality to be heated, said controller being of any suitable or desired construction, and is provided with a thermostatic element 11, one end of which is suitably connected with the controller, and the opposite end is movable between, and is adapted to contact with, one or the other of the two contact points 12 and 13 which are suitably mounted upon the controller 10.

14 designates a binding post in suitable connection with the contact point 12 and 15 designates a binding post in suitable connection with the contact point 13, said controller 10 having a third contact post 16 which is in suitable connection with the battery.

17 designates a connection binding post carried by the motor 5, which latter is also provided with a binding post 18, which is in suitable connection with the operative parts of the motor, in order that when the circuit is closed the motor is actuated to close the drafts, as will be hereinafter set forth.

19 designates a binding post which is in suitable connection with the battery of the motor, and 20 designates a binding post which is in suitable connection with the operative portion of the motor 5, in order that when the circuit is closed the motor is actuated to open the drafts, as will be hereinafter set forth.

21 designates a conductor, connected at one end with the binding post 14 of the controller, and at the opposite end, with the closing draft post 18 of the motor.

22 designates a conductor which is in suitable connection with the binding post 15 of the controller, and which is connected with the connection post 17 of the motor.

23 designates a conductor which is in suitable connection with the battery binding post 16 of the controller and with the battery post 19 of the motor.

24 designates a thermostat, which is suitably located with respect to the furnace, and which is of any suitable or desired construction, and which is provided with a thermostatic element 25 which, in the present instance, extends suitably into and is suitably supported in the furnace 1; said thermostatic element, 25, being provided with or having connected thereto, a member 26, formed of nonconducting material, a suitable portion of which is adapted to be seated between, and preferably in contact with, the two vibrators 27 and 28 which are suitably carried by the thermostat 24.

29 designates a binding post which is in suitable connection with a contact point 30 and 31 designates a binding post in suitable connection with a contact point 32, these parts being suitably mounted and supported by the thermostat 24, it being understood that the contact point 32, in the present instance, is one with which the vibrator 28 will contact when the temperature is such that the draft is on; and the contact point 30 is the one, in the present instance, with which the vibrator 27 will contact in order that the draft will be shut off.

33 designates a conductor which is in suitable connection with the connection post 17 of the motor, and with the binding post 31 of the thermostat 24.

34 designates a conductor which is in suitable connection with the closing draft post 18 of the motor, and with the binding post 29 of the thermostat 24.

35 designates a binding post on the thermostat and in suitable connection to the battery; and 36 designates a binding post also carried by the thermostat, it being noted that the binding post 35 is in suitable connection with the vibrator 27, and that the binding post 36 is in suitable connection with the vibrator 28.

37 designates a conductor which is in suitable connection with the battery post 19 of the motor, and also with the binding post 35 to the thermostat.

38 designates a conductor which is in suitable connection with the opening draft post 20, of the motor 5, and also with the binding post 36, of the thermostat 24.

As will be noted, the contact post 16 of the controller 10 is in suitable connection with the binding post 19 through the medium of the conductor 23 and that said binding post 19 is in suitable connection with the battery through conductor 45, while the said battery is in connection with the magnets through the medium of the conductor 44, said magnets being also connected with the contact point 50 of the motor through the medium of the conductor 46. The binding post 18 is connected with the contact point 49 of the motor through the conductor 48 while the binding post 20 is connected with the contact point 51 of the motor through the medium of the conductor 47. It will be understood that the said contact points 49, 50 and 51 will be alternately in contact with the contact piece or switch 52 of the motor in order to close the proper circuits. As soon as the movement of the motor occurs through the magnets being energized by the completion of the circuit to the thermostats, the complete movement of the motor will shift the switch 52 from its then position to the opposite position thus opening the circuit previously established and closing it for the next movement of the thermostats. For example, it will be understood that the parts are in the position seen in Fig. 2, the strip 11 has been moved, by the temperature, to contact with the point 12, prior to which contact the contact piece 52 of the motor was in engagement with the contact point 49 and 50 of the motor and the flow of current at that time is as follows:—from the binding post 19, through the conductor 23, through the strip 11, point 12, conductor 21, binding post 18, through conductor 48 to contact point 49, through contact piece 52, contact point 50 and thence through the conductor 46, through the magnets and conductor 44 to the other pole of the battery, this closed circuit energizes the magnets to operate the motor in order to move the contact piece 52 in order that the same will contact both with the contact point 50 and 51 as shown, the circuit through 49 is broken, and at the same time moving the dampers to shut off the draft. Should the strip 27 be in contact with the point 30 the flow of current will now be from the binding post 19 through the conductor 37 through strip 27, point 30 and through conductor 34 to binding post 18 and thence through the magnet to the battery, as previously described, it being understood that the contact piece 52 was then in engagement with the contact points 49 and 50.

The above description will show the absolute independence of the two circuits in closing the dampers to close the draft. To show the interdependence of the circuits to put on the dampers, the following would be the course of the current:—from binding post 19, through conductor 23, through strip 11 and point 13, through conductor 22, binding post 17, through conductor 33 to point 32, through strip 28 and conductor 38 to binding post 20, through conductor 47, through contact point 51, contact piece 52 and contact point 50, through conductor 46 to magnets and conductor 44 to the battery, thus completing the circuit. From this it will be seen if either of the strips 11 or 28 are out of contact with their proper points, the circuit will not be closed and so the dampers cannot be opened to put on the draft.

The operation of the device is as follows: When the parts are in the position seen in the figures it will be noted that the thermostatic element 11, of the controller 10, is in contact with the contact point 12; while the vibrator 28 is in contact with the contact point 32. In this position the draft is off, that is to say, the air damper 4 is closed by reason of the fact that the circuit which actuates the motor for opening the damper, is open, since the current would, when the parts are in this position, pass from the battery post 19, through the conductor 23, to the binding post 16, and through the thermostatic element 11, to the contact point 12, and through the binding post 14, and conductor 21, to the closing binding post 18 on the motor, which would operate the latter to move the lever 6 to a position to close the damper 4 and open the damper 3, by means of the connections 7 and 8. Should, however, the temperature in the room fall below the desired point, the thermostatic element 11 will be actuated or moved, by this, over into contact with the contact point 13, immediately upon which the circuit will be closed in the following manner: from the battery post 19 through the conductor 23 to the binding post 16, thence to the thermostatic element 11, through the contact point 13, through the binding post 15, conductor 22, to post 17, by the conductor 33 to the binding post 31, and thence through the contact point 32, and through the vibrator 28, through the binding post 36, and the conductor 38, to the opening binding post 20, on the motor, which is actuated to open the damper 4, and to close the damper 3, the same remaining in this position until the desired temperature in the room is reached, when the thermostatic element 11 is returned to its position seen in the figures, at which time (except under conditions as hereinafter stated) the motor is operated as previously described, to again close the damper 4 and to again open the damper 3. It will thus be seen that in order to throw on the draft it is necessary for the circuit to pass through the controller and through the thermostat, so that it is necessary that the thermostatic element of both of these parts be in proper position, so that the on-draft circuit is closed, thus the controller and thermostat are interdependent for throwing or putting on the draft.

In some instances it may occur that while the temperature in the room has not been raised to a sufficient point to actuate the thermostatic element 11 to close off the draft, the fire in the furnace would reach a predetermined temperature where it is desirable to check the draft; when this occurs the thermostatic element 25 of the thermostat will be actuated in order to move the vibrator 27 into contact with the contact point 30, thus removing the vibrator 28 from contact with the contact point 32, immediately upon which the circuit will be closed from the battery post 19 through the conductor 37 to the binding post 35, through the vibrator 27, contact point 30, binding post 29, and conductor 34, to the closing binding post 18, of the motor 5, which latter will immediately be actuated to close the damper 4 and open the check draft damper 3 and stop the draft. It will thus be seen that the controller and the thermostat are independent of each other for closing the damper and so shutting off the draft, that is to say, the thermostatic element of the controller, in one position, closes a circuit with the motor for shutting off the draft this being accomplished through the circuit from the battery binding post 19 through conductor 23 and the binding post 16 of the controller through thermostatic element 11, contact point 12, binding post 14, conductor 21, through binding post 18 of the motor which closes the circuit and is operated to close the drafts. The thermostatic element of the thermostat in one position closes a circuit with the motor for shutting off the draft, the circuit in this position being through the battery binding post 19, through conductor 37, binding post 35, vibrator 27 of the thermostat, contact point 30, binding post 29 and conductor 34 to the motor binding post 18 which closes the circuit to close or shut off draft. In this way it will be seen that the controller and the thermostat are independent of each other, through the circuits just described, for closing the damper and so shutting off the draft. To put on the draft, both of the thermostatic elements are in a third circuit with the motor, in order that both thermostats must be in proper position to close the said third circuit to put on the draft, this circuit being as follows: from the battery binding post 19 through the conductor 23, binding post 16, thermostatic element 11 binding post 16, thermostatic element 11 with the contact point 13, against which the element 11 has been moved, through the binding post 15, conductor 22, binding post 17, conductor 33, binding post 31, contact point 32, vibrator 28 of the thermostat, binding post 36, conductor 38 to binding post 20 of the motor which closes the circuit to operate the opening of the draft. From this it will be seen that if either of the thermostatic elements 11 or 28 are out of contact with the respective contact points 13 and 32 the circuit will not be closed, and the draft will not be put on, or, in other words, the controller and the thermostat are interdependent in order to put on the draft.

Having thus described my invention, what I claim as new and desire to secure by Letters Patent, is:—

1. In a device of the character stated, a temperature changing device, a controlling means located at a suitable point and adapted to be actuated, depending upon the temperature thereat, a second controlling means situated within said temperature changing device, and subjected directly to the radiant heat and to the products of combustion of the fire without the interposition of a transmitting medium, actuating means in suitable connection with said temperature changing device for controlling the same, and electrical circuits between said first controlling means and actuating means, and between said second controlling means and said actuating means, whereby the actuating means is operated to increase or decrease the action of the temperature changing device, said electrical circuits being interdependent for increasing the action and independent for decreasing the same.

2. In a device of the character stated, a temperature changing device, a controller located at a suitable point and adapted to be actuated, depending upon the temperature thereat, a thermostat situated within said temperature changing device and subjected directly to the radiant heat and to the products of combustion of the fire without the interposition of a transmitting medium, a motor in suitable connection with said temperature changing device for controlling the same, and electrical circuits between said controller and motor, and between said thermostat and motor, whereby the motor is actuated to increase or decrease the action of the temperature changing device, said electrical circuits being interdependent for increasing the action and independent for decreasing the same.

3. In a device of the character stated, a temperature changing device, a controller actuated by the temperature at a desired point, a thermostat situated directly within said temperature changing device and subjected directly to the radiant heat and to the products of combustion of the fire without the interposition of a transmitting medium, a motor in suitable connection with said temperature changing device for controlling the same, an electrical circuit for each movement between said controller and said motor for actuating said motor to decrease the action of said changing device, an electrical circuit for each movement between said thermostat and said motor for actuating said motor to decrease the action of said changing device, and an electrical connection between said controller, said thermostat and said motor to increase the action of said temperature changing device.

4. In a device of the character stated, a temperature changing device, a motor in suitable connection with said changing device to control the same, a controller having a thermostatic element, an electrical circuit for said controller and said motor, said element in one position closing said circuit to actuate said motor to decrease the action of said changing device, a thermostat having a thermostatic element situated within said temperature changing device and subjected directly to the radiant heat and to the products of combustion of the fire without the interposition of a transmitting medium, an electrical circuit for said thermostat and said motor, said element in one position closing said circuit to actuate the motor to decrease the action of said changing device, and an electrical circuit between said motor, said controller and said thermostat, the last mentioned circuit being controlled by the two thermostatic elements, and said circuit being closed, when said elements are in their other positions, respectively, to actuate the motor to increase the action of the said changing device.

BENJAMIN F. TEAL.

Witnesses:
    WM. CANER WIEDERSEIM,
    C. D. McVAY.